United States Patent [19]
Efferson

[11] 3,943,767
[45] Mar. 16, 1976

[54] LEVEL DETECTOR SYSTEM FOR CRYOGENIC LIQUIDS

[75] Inventor: Kenneth R. Efferson, Oak Ridge, Tenn.

[73] Assignee: American Magnetics, Inc., Oak Ridge, Tenn.

[22] Filed: July 22, 1974

[21] Appl. No.: 491,155

[52] U.S. Cl. ................................................ 73/295
[51] Int. Cl.² ........................................ G01F 23/24
[58] Field of Search ........................................ 73/295

[56] References Cited
UNITED STATES PATENTS

| | | | |
|---|---|---|---|
| 3,267,730 | 8/1966 | Satterthwaite et al. | 73/295 |
| 3,496,773 | 2/1970 | Cornish | 73/295 |

FOREIGN PATENTS OR APPLICATIONS

| | | | |
|---|---|---|---|
| 1,176,907 | 1/1970 | United Kingdom | 73/17 R |

Primary Examiner—Richard C. Queisser
Assistant Examiner—Frederick Shoon
Attorney, Agent, or Firm—Martin J. Skinner

[57] ABSTRACT

An improvement has been made to a cryogenic liquid level detection system of the type wherein a small electrical current is passed through a filament of superconducting material to generate a voltage proportional to the length of the filament above the liquid level. This improvement involves automatically interrupting the current flow immediately upon the growth of the normal resistance state of the filament above the liquid down to the liquid surface. Normally current flow is then reinitiated after a preset time interval. In this manner there is a minimum energy input to the liquid from the current and thus evaporative losses of the liquid are minimized.

6 Claims, 4 Drawing Figures

LEVEL DETECTOR SYSTEM FOR CRYOGENIC LIQUIDS

BACKGROUND OF THE INVENTION

The present invention relates generally to the measurement of the level of cryogenic liquids in dewars and the like, and more particularly to cryogenic liquid level detector systems utilizing current-carrying superconductor filaments as the detector element.

Liquefied gases such as helium, oxygen, hydrogen and nitrogen are frequently utilized as coolants, fuels, etc., for many processes and apparatus. For example, extensive use is now made of superconducting magnetic coils which must be operated at temperature approaching 0°K. Even superconducting transmission lines are under investigation. A typical coolant for superconducting applications is liquid helium which produces a temperature of about 4.2°K. Because of the heat input to any such system, the helium evaporates and must be replaced. This is normally accomplished by attaching a container (dewar) of liquid helium to the system. Since the cryogenic liquid levels are not easily viewed, some form of level detector must be utilized in all of the systems and dewars. Such a detector provides a signal proportional to the liquid level, and the associated circuitry may initiate a refilling operation when the level reaches a set low point. Generally a detector which provides a continuous indication of the level is preferred over fixed-point detectors. Such a detector is provided by a filament of superconducting material vertically suspended in the dewar and positioned so that the gas-liquid interface in the dewar moves along the filament. A current is passed through the filament and the voltage generated across the filament is a measure of the level of the interface. This voltage is created because the portion of the filament above the liquid level is in the normal resistance state of the superconducting material and exhibits at least a moderate electrical resistance. This is in contrast to the superconducting state where the resistance is substantially zero. Normally a small heater in contact with the filament assures the existence of the normal state above the level. The generated voltage is therefore relatable to the level of the liquid. Further description of a typical cryogenic liquid level detector may be found in my publication "A Superconducting (Nb-Ti) Liquid Helium Level Detector," Advances in Cryogenics Engineering, Vol. 15, p. 124 (1970), Plenum Press. Another description may be found in U.S. Pat. No. 3,267,730.

One concern of any user of a cryogenic system is the minimization of evaporative losses. Although the superconductor filament level detector utilizes only a small current, e.g., <100 mA, the power input due to this current increases the liquid loss. One partial solution known in the art involves periodically, at a fixed time interval, applying the current so that the level is sampled intermittently. Since there is a time delay in reaching a stabilized voltage for a given liquid level each time current flows in the filament, due to the progression or growth of the normal resistance zone down to the gas-liquid interface, the on-time of the current must be sufficiently long to assure a stable voltage at the lowest possible liquid level. Such a detector system with a fixed time interval is marketed by Intermagnetics General Corporation of Guilderland, N.Y. Even this method of intermittent current flow at regular intervals introduces undersirable heating and evaporative losses.

SUMMARY OF THE INVENTION

According to my invention, current is intermittently passed through the filament of superconducting material of a liquid level detector. This current flow is automatically stopped whenever the output voltage is substantially stabilized for any liquid level and the voltage across the filament is then sampled. Normally, after a preset time interval, the current flow is again initiated and it continues until the output voltage is again stabilized for a new (or same) liquid level. Thus, the current on-time is regulated by the level of the liquid, i.e., shorter times for higher levels, and a true minimum of energy is imparted to the liquid by the liquid level detector.

DETAILED DESCRIPTION

Figure 1:
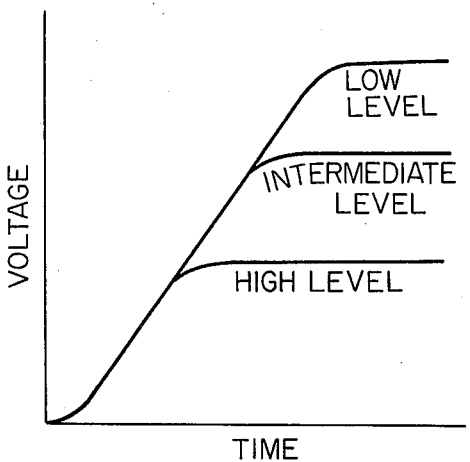
FIG. 1 is a graph illustrating the voltage-time response of a superconductor filament, partially submerged in liquid helium, when subjected to a step function of current.
Figure 2:
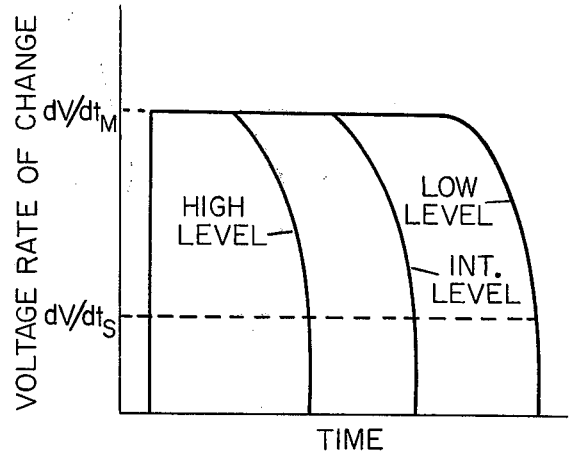
FIG. 2 is a graph illustrating the derivative (rate of change) of the voltage across a filament of superconducting material partially submerged in liquid helium as a function of time after initiation of a constant current flow through the filament.

When no current is flowing through the filament of superconductortype liquid helium level detectors and no heat is applied, the portion of the filament above the surface of the helium attains a superconducting state due to the temperature of the ambient gas. Upon the simultaneous application of heat and current, the top of the filament is converted to the normal resistance state and this normal state "grows" down to the gas-liquid interface. During this gradual transition and growth, the voltage generated along the filament increases in a generally linear manner as illustrated in FIG. 1. Because of the linear increase, the rate of change (the derivative) of the voltage remains constant as illustrated in FIG. 2. As the front of the transition approaches the liquid level there is some slowing down of the voltage increase, and a reduction in the derivative, which results in the knees of the responses. When the transition is complete, i.e., the normal state reaches the liquid, the voltage becomes constant for a particular liquid level and the derivative, $dV/dt$, approaches zero.

Figure 3:
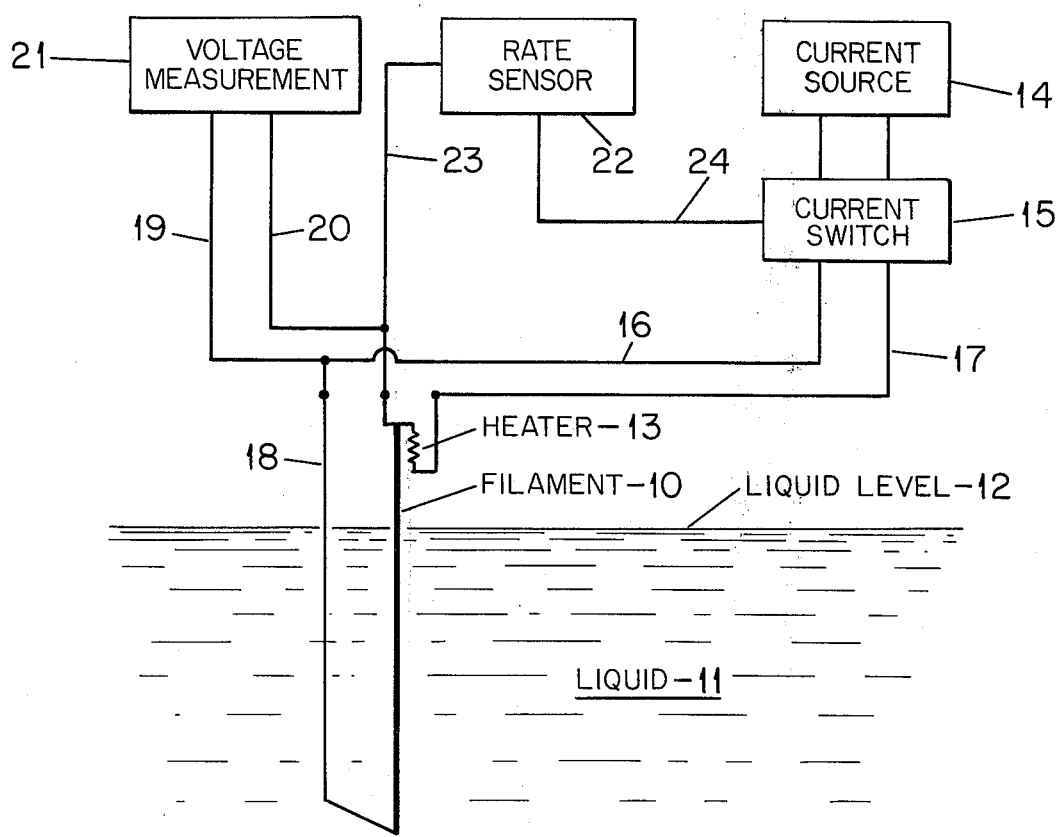
FIG. 3 is a schematic block diagram of the system of my invention which minimizes energy input for any level of cryogenic liquids.

I have utilized the voltage rate change, specifically the approach to zero, to control the time interval of current flow to the superconductor filament liquid level detector. A schematic block diagram of my invention is shown in FIG. 3. A detector element with a superconductor filament 10 is at least partially immersed in a body of liquid helium 11 having a liquid surface or level 12. The top of the filament is provided with a juxtaposed heater 13 in a conventional manner. A current source 14 is connected to the filament 10 and heater 13 through current switch 15 by leads 16, 17 and 18. Lead 18, together with leads 19, 20 connect a voltage measurement system 21 across the length of filament 10. A rate sensor 22 is connected to the filament 10 or to the voltage measurement system 21 with lead 23, and this rate sensor 22 is connected to current switch 15 through lead 24. Although not shown, the filament, heater and current and voltage taps may be assembled within a cylindrical body in a conventional manner. Openings would be provided in the body to admit the liquid to the filament and to permit exit of any gas.

In a normal operation of this generalized embodiment of my invention, the detector element (comprising the heater and the filament mounted within a suitable support) is placed in a dewar or other container and liquid helium is added until at least a portion of the filament is submerged. Due to the low temperature of the gas phase above the liquid all of the filament becomes superconducting as discussed above. Current from source 14 is then supplied, through switch 15, to the heater 13 and filament 10. As illustrated in FIG. 1, initially there is substantially no voltage generated across filament 10 because of the superconducting state thereof. However, after 50–100 msec the heater 13 will have produced a small region of normal resistance state in the filament 10, the front of which will progress under the application of the current toward the gas-liquid interface. This causes the voltage across the filament to increase in a generally linear manner, as shown in FIG. 1, and the rate of change is constant at $dV/dt_M$ (see FIG. 2). As the gas-liquid interface is approached, the voltage becomes essentially constant and thus the rate of increase of voltage changes until there is no increase ($dV/dt = 0$) as the normal resistance state substantially reaches the interface.

At a suitably low value of $dV/dt$, e.g., $dV/dt_S$, where $0 \leq dV/dt_S < dV/dt_M$, the rate sensor 22 causes switch 15 to open and current ceases to flow through filament 10 and heater 13. Thus, the level detection system returns to its initial condition. A timer (not shown) may be associated with switch 15 to reinitiate current flow after a suitable delay so as to periodically repeat the cycle. Thus, it will be seen that current flows only during the time necessary to move the normal state front to the liquid level and that this time varies as a function of the liquid level (see FIGS. 1 and 2). Accordingly, a minimal amount of energy is introduced by the liquid level detector thus minimizing evaporation of the helium.

Figure 4:
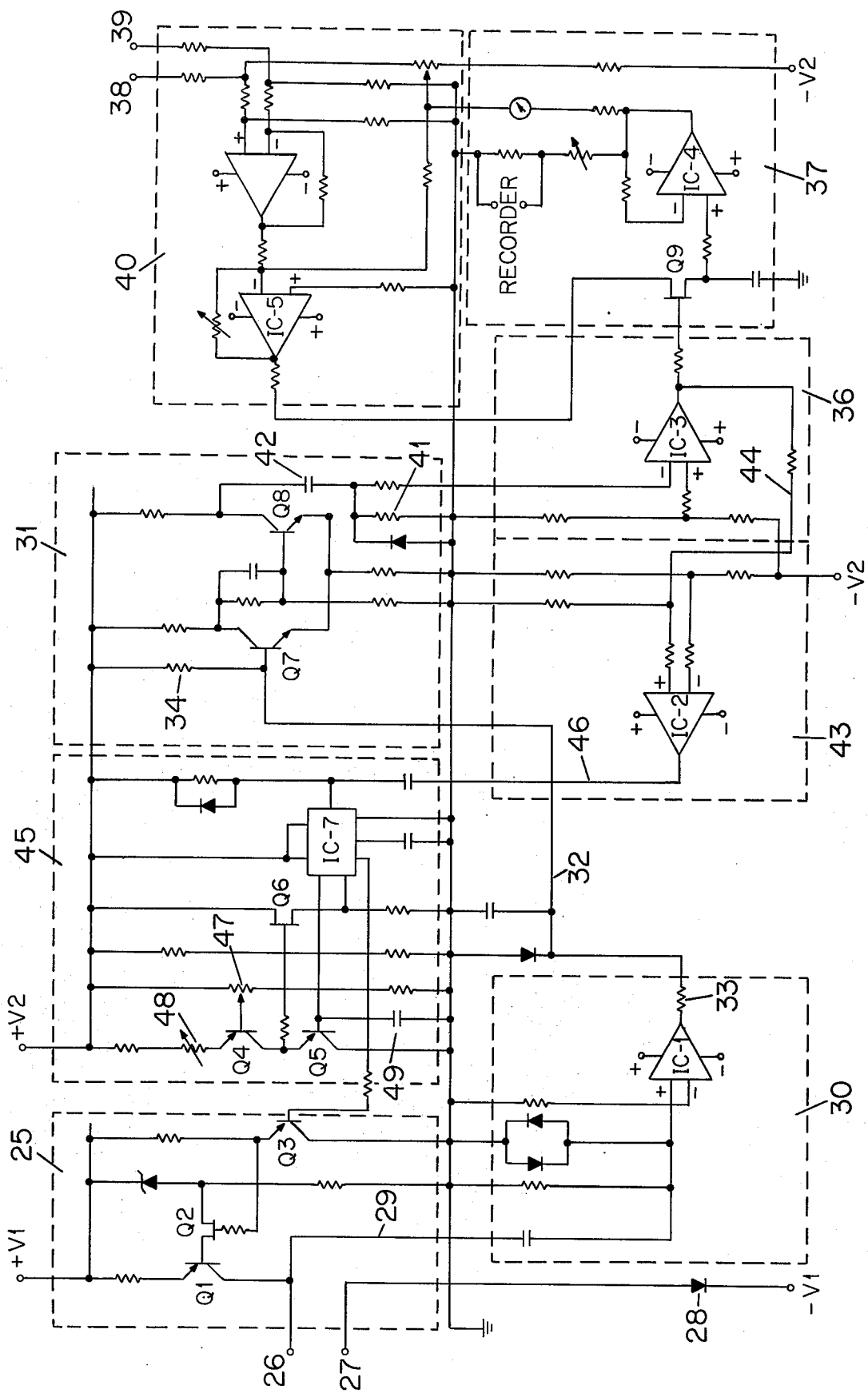
FIG. 4 is a schematic circuit diagram of an electrical circuit to accomplish my invention.

A detailed circuit diagram of an embodiment of my invention is shown in FIG. 4. At the upper left is a conventional current source 25 which supplies a desired current, e.g., <100 mA, through transistor Q1 to connection 26 of a sensor unit (not shown). The return from the sensor is through connection 27 and diode 28, the purpose of which will be discussed hereinafter.

The rate of change of the voltage ($dV/dt$) at connection 26 is sampled through lead 29 and by the R-C differentiating unit 30. The differentiating unit is connected to a Schmitt trigger 31 by lead 32. The existence of a significant $dV/dt$, as during the constant period indicated in FIG. 2, causes transistor Q7 of the trigger 31 to inactivate transistor Q8. The existence of the aforementioned diode 28 gives rise to an immediate $dV/dt$ as soon as current flows from source 25. When the $dV/dt$ reaches a set low value, $dV/dt_S$, the value of which is determined by resistors 33, 34, the trigger 31 is flipped whereby transistor Q8 is enabled to create a signal, via lead 35, to a first comparator 36 which, in turn, opens the gate of FET Q9 in a holding circuit 37. This causes the voltage across connections 38, 39, and amplified in a voltage sensing circuit 40, to be sampled and held for a short time so as to be recorded.

After the voltage is sampled for a short time, as established by resistor 41 and condenser 42, the first comparator 36 initiates a signal to a second comparator 43 through lead 44. The second comparator 43, in turn, produces a signal for a timer 45 which is transmitted on lead 46. The signal to the timer 45 turns off the detector current through transistor Q1 as controlled by IC-7 and transistors Q2 and Q3. A time delay until the current is turned on again is determined primarily by the values of resistors 47, 48 and condenser 49 within the timer 45.

The operation of the circuit is then repeated at a frequency governed by the set "off" time and the variable "on" time which is proportional to the level of the liquid. It will be apparent that, for a slowly changing liquid level, the "off" time may be set for a long period or a manual switch may be used to further reduce the power input to the liquid helium system. The "on" time will automatically be the minimum input due to the manner of operation.

A liquid level detector system according to the circuit of FIG. 4 was constructed and tested with a 12 inch sensor fabricated from a wire of Nb-48Ti (T48B manufactured by Supercon Div., Norton Co., Natick, Mass.). The sensor was immersed vertically in a dewar containing liquid helium. The current source was set to supply about 70 mA to the sensor. Upon initiation of current flow there was about a 50 msec delay prior to the development of measurable voltage across the sensor during a period of forming a small region of normal resistance state in the wire. Thereafter the normal state progressed along the wire at a rate of about 20 cm/sec until the normal state region extended to near the liquid surface. During the progression of the normal state along the superconductor wire the voltage across the sensor increased in approximately a linear manner and the rate of change was similar to that of FIG. 2. When the normal state reached the surface of the liquid the voltage became constant and the rate approached zero. The current to the superconductor wire was automatically interrupted at this point. After an appropriate interval of time, as set by the parameters of the timer circuit, the operation was automatically repeated. Due to a slight decrease in level the time required for the normal state to reach the liquid level increased incrementally. Testing continued and it was found that approximately 1.4 sec was required for the normal state to progress along the entire twelve inch Nb-Ti wire when only exposed to the cold gas above the liquid.

From these tests it may be seen that if a uniform pulsing rate is used, as in the prior art, the current must flow for at least 1.4 sec for a 12 inch Nb-Ti sensor and a proportionally greater time for longer sensors. During the time when the sensor is substantially submerged a deleterious quantity of power is introduced thereby increasing liquid helium evaporation. However, with my invention, no matter what length sensor is used, the power input to the cryogenic system by the liquid level detector is always a minimum at any liquid level position. This is a greater advantage with longer sensors.

A generalized form of my invention has thus been described as well as a specific embodiment. It will be apparent that other embodiments within the framework of the general form may be constructed without departing from my invention to minimize the heat input to a body of cryogenic liquid from a superconducting liquid level detector. In addition, although I have used a constant current flow in the filament to achieve these results, it is obvious that a variable current could be used to achieve the same type of power input reduction.

Furthermore, my invention has been described with particular application to a liquid helium level detector utilizing a Nb-Ti superconductor filament. This should not be construed as a limitation of my invention for it may be used with other superconductor materials such as Nb-25Zr, annealed Ta, Pb-Sn in liquid helium. It may also be used with other superconducting filaments having a critical temperature near but above the normal boiling point of any cryogenic liquid. For example, several Nb-Ge superconductors exhibit a critical temperature of about 22°–23°K and thus may be useful in liquid hydrogen where the normal boiling point is 20.4°K. My detector system would be useful to minimize the evaporation of hydrogen using such a detector element in the manner described above.

I claim:

1. A cryogenic liquid level detector system for use with a superconductor filament at least partially submerged in a cryogenic liquid to obtain a voltage signal proportional to the liquid level and to minimize energy input to the cryogenic liquid, which comprises:
   a current source for supplying current to the filament and to a heater associated with the filament for producing a normal resistance state in the filament and causing the normal resistance state to progress along the filament to the liquid level;
   voltage measuring means connected across the filament for producing the voltage signal proportional to the liquid level;
   a switch connected between the current source and the filament; and
   sensing means, responsive to the progression of the normal resistance state along the filament, connected to the filament and to the switch for interrupting the current to the filament and the heater upon the arrival of the normal resistance state in the filament at substantially the liquid level whereby energy input to the liquid is minimized for any liquid level.

2. The cryogenic liquid level detector system of claim 1 wherein the sensing means comprises: a voltage derivative circuit monitoring the rate of change of the voltage across the filament and providing an output signal proportional to the rate of change of the voltage; and circuitry responsive to a set low value of the output signal of the derivative circuit providing an output signal to initiate operation of the switch to interrupt the current to the filament and heater.

3. The cryogenic liquid level detector system of claim 2 further comprising a timer connected to the switch to automatically reinitiate current to the filament and heater for repetitive operation.

4. The cryogenic liquid level detector system of claim 2 wherein the current source provides a substantially constant value of current.

5. The cryogenic liquid level detector of claim 2 wherein the switch comprises: a first comparator, responsive to output signal of the sensing means, connecting the voltage measuring means to the filament; and a second comparator providing a signal to the current source to interrupt current to the filament and heater.

6. A method of minimizing energy input to a cryogenic liquid by a level detector of the type wherein a constant value electrical current flowing through a filament of superconducting material at least partially submerged in the liquid produces a voltage proportional to the position of the liquid level along the filament, which comprises:
   passing the constant value electrical current through the filament and a heater juxtaposed to the filament whereby a region of normal resistance state is created in the filament;
   continuing the flow of said current to extend the region of normal resistance state to substantially the level of the liquid;
   sensing the arrival of the region of normal resistance state at substantially the level of the liquid;
   causing the cessation of current flow upon the arrival of the region of normal resistance state at substantially the level of the liquid; and
   measuring the voltage immediately prior to the cessation of the current flow.

* * * * *